(No Model.)

A. W. SCHIEDING.
VELOCIPEDE.

No. 449,498. Patented Mar. 31, 1891.

WITNESSES:
J. H. Thieberath
E. M. Clark

INVENTOR:
A. W. Schieding
BY Munn & Co.
ATTORNEYS

UNITED STATES PATENT OFFICE.

ANDREW W. SCHIEDING, OF TURNER'S FALLS, MASSACHUSETTS.

VELOCIPEDE.

SPECIFICATION forming part of Letters Patent No. 449,498, dated March 31, 1891.

Application filed July 29, 1890. Serial No. 360,281. (No model.)

*To all whom it may concern:*

Be it known that I, ANDREW W. SCHIEDING, of Turner's Falls, in the county of Franklin and State of Massachusetts, have invented a new and Improved Velocipede, of which the following is a full, clear, and exact description.

My invention relates to improvements in velocipedes; and the object of my invention is to produce a velocipede that may be easily and rapidly driven, that may be propelled over heavy grades, and that has means for adjusting the power.

To this end my invention consists in certain features of construction and combinations of parts, which will be hereinafter fully described, and then pointed out in the claims.

Reference is to be had to the accompanying drawings, forming a part of this specification, in which similar letters of reference indicate corresponding parts in all the figures.

Figure 1:
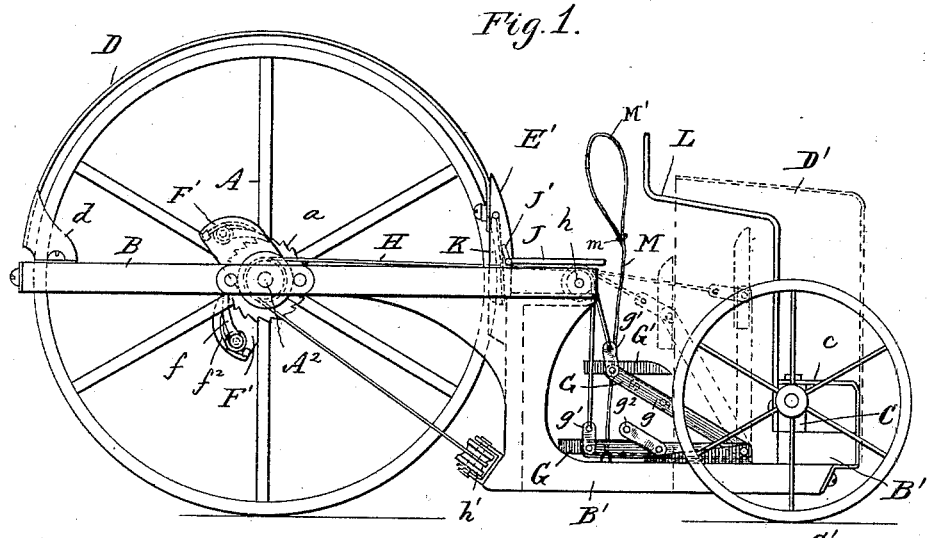
Figure 2:
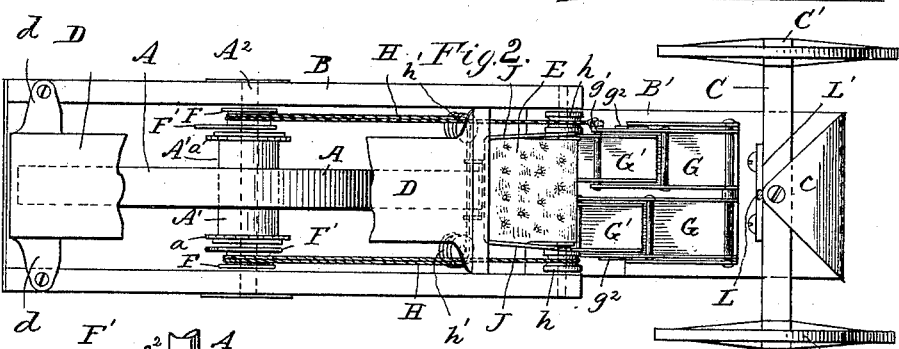
Figure 3:
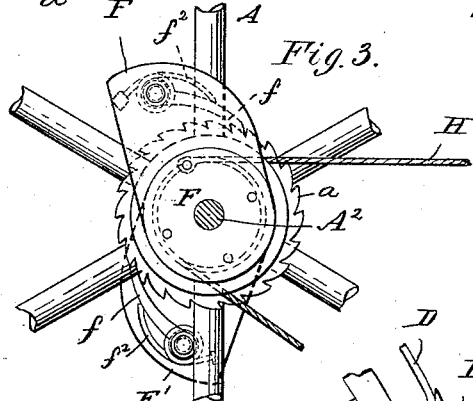
Figure 4:
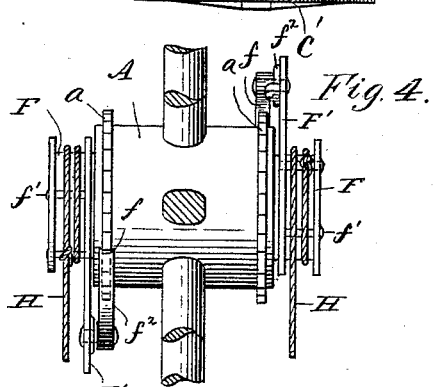
Figure 5:
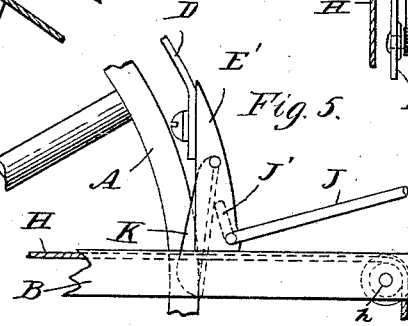

Figure 1 is a side elevation of the velocipede with the top shown in dotted lines. Fig. 2 is a broken plan view of the same with the top removed. Fig. 3 is a broken enlarged detailed view of the driving-wheel, showing the ratchet mechanism for turning the wheel. Fig. 4 is a broken plan view of the same, and Fig. 5 is a broken enlarged detail view of the brake as applied to the driving-wheel.

The main driving-wheel A is provided with a suitable hub A', to each end of which is fixed a ratchet-wheel $a$, and the wheel is mounted on an axle $A^2$, which is supported in suitable bearings in the horizontal frame B.

A frame B' is fixed to the front end of the frame B, said frame extending nearly to the ground, and pivoted to the under side of an upward and rearward extension $c$ thereof and to the frame B' is the axle C, on which are mounted the forward wheels C'.

A fender D extends over the top of the driving-wheel A, the rear portion of the fender being fixed to the horizontal frame B by means of the ears $d$ and suitable screws, and the front end of the fender being fixed to the back E' of the seat E.

A top D' (shown by dotted lines in Fig. 1) covers the front portion of the velocipede and may be made to incase the whole front portion of the machine, and may have suitable doors therein.

A seat E is supported between the two side pieces of the frame B near the front end thereof and is provided with a suitable back E'.

Mounted loosely on the axle $A^2$ at each end of the hub A' of the driving-wheel are skeleton pulleys F, consisting of outer and inner flanges united by cross-pins $f'$, the inner flange of each pulley being provided with a radially-projecting extension F', to which is pivoted a pawl $f$, which engages the teeth of the corresponding ratchet-wheel $a$, and is held in engagement therewith by a spring $f^2$.

Pivoted on the lower portion of the frame B' and near the front axle C are treadles G, which extend rearwardly beneath the seat E, the treadles having rearwardly-extending side pieces $g$, between the rear ends of which are pivoted the pedals G'. The outer side piece $g$ of each treadle has a lug $g'$ pivoted to the end thereof, and a similar though somewhat longer lug $g^2$ is pivoted to the outer side pieces near the central part thereof.

A cable H is attached to a lug $g'$, the treadle carrying the lug being first partially raised, and from thence the cable extends over one of two pulleys $h$, which are pivoted in the front end and in opposite sides of the frame B, and from thence over and once around a pulley F, thence around one of two pulleys $h'$, which are pivoted on the rear portion of the frame B', thence around the opposite pulley $h'$, thence once around the pulley F, opposite that already wound, and from thence over the other pulley $h$ to the lug $g'$ of the opposite treadle. It will thus be seen that when a treadle is depressed one of the pulleys F will be turned forward, and the pawl carried by the pulley will engage the ratchet-wheel $a$ on the hub of the driving-wheel A, thus turning the driving-wheel, and at the same time the opposite pulley F will be moved backward, carrying the pawl with it, and the opposite treadle will be raised, when the operation may be repeated.

When the power is to be increased, the cables H are detached from the lugs $g'$ and are attached to the lugs $g^2$, thus bringing the point of the connection between the pedals and the points at which the treadles are pivoted, so that while the speed will be somewhat decreased the power will be greatly increased. The pedals G' are pivoted between the side pieces of the treadles, as shown, and when in the position shown by full lines in Fig. 1 the operator stands upon the treadles and throws his weight first upon one and then upon the other; but when the operator desires to sit the treadles are raised, as shown by dotted lines in Fig. 1, and the operator places his feet upon the pedals, presses his back against the back E' of the seat, and pushes the pedals alternately from him, thus actuating the cable H and turning the driving-wheel.

A rod J is bent to extend along the sides of the seat E and across the back of the seat, the rear portion of the rod being formed into a crank J', and a brake-shoe K is pivoted in the seat-back, the shoe being pivoted at the top, so as to rest against the crank J'. It will thus be seen that by raising either end or both ends of the rod J the crank J' will be forced against the brake-shoe, thus forcing the shoe against the rim of the driving-wheel A and checking the speed of the machine.

A rod L is attached to the top of a plate L', which is fixed to the front axle C, and said rod extends upwardly and is curved so as to reach to a point adjacent to the seat E, and the operator by grasping the rod and turning it to the right or left turns the axle C and the wheels C', thereby steering the machine.

A tug M is fixed to the frame B' and is provided at the top with a loop M', which may be adjusted by means of the buckle $m$, and the tug is to be used when the velocipede is to be driven up a steep grade.

To apply the tug the operator places the loop M' over his shoulders and adjusts it in such a manner that when he straightens up it will increase his weight upon the pedals. An ordinary person can lift his weight at least, and by lifting upon the tug M it will readily be seen that an additional weight is thereby brought to bear upon the treadles, thus increasing the power of the machine.

The front portion of the machine may be made large enough to accommodate several persons and to take in some baggage.

To operate the machine the treadles G are actuated in the manner already described, thus moving the cable H and turning the pulleys F, which cause the pawls $f$ to alternately engage the ratchet-wheels $a$, thereby turning the driving-wheel and propelling the machine, and it will be readily seen that when one pawl moves forward the other will travel backward over the ratchet-wheel, and it will be observed that it is not necessary that each stroke of the treadles should be of the same length or that the strokes should be made regularly, as the pawls are sure to engage the ratchet-wheels and propel the machine at every stroke of the treadles. The diameter of the pulleys F should correspond to the length of the stroke of the treadles G, so that each stroke of a treadle will impart a revolution to one of the pulleys F, and consequently to the driving-wheel A, and it will thus be seen that the machine may be driven at great speed.

I do not confine myself to the particular arrangement of the pulleys $h$ and $h'$, as they may be placed in any convenient part of the machine, so as to obviate friction from the cable H.

Having thus fully described my invention, I claim as new and desire to secure by Letters Patent—

1. A velocipede comprising a frame, driving and steering wheels, a pawl-and-ratchet operating mechanism, and two vertically-swinging foot-treadles connected with said pawls and constructed to lie in horizontal planes when the operator desires to stand on them and to be swung up into vertical position when the operator desires to push upon them in a forward direction with his feet when seated, substantially as set forth.

2. A velocipede comprising the frame, the steering-wheels at the front end thereof, the axle $A^2$, having two pulleys F, each formed of spaced plates having connecting-pins $f'$, the inner plates having extensions F', provided with spring-pressed pawls $f$ on their inner faces, the driving-wheel A, having a hub loose on the axle and provided with two ratchet-wheels engaged by said pawls, treadles, and a flexible connection between the two axle-pulleys and the treadles, substantially as set forth.

3. The combination, with a velocipede having a seat E, provided with a back E' just in front of the main driving-wheel, of a depending brake K, pivoted at its upper end to the rear of the seat-back, a crank J between the back and brake to throw the latter against the periphery of the drive-wheel, and a rod J, projecting from the crank within reach of the operator, substantially as set forth.

4. A velocipede comprising a frame, a driving-wheel mounted in one end of the frame and having each end of its hub provided with a ratchet-wheel, a pair of wheels pivoted to the opposite end of the frame and provided with a steering-rod, pulleys journaled at each end of the driving-wheel hub, said pulleys having pawls thereon to engage the ratchet-wheel, a pair of treadles pivoted in the machine-frame, and a single continuous cable connecting the two treadles, said cable passing over suitable pulleys $h$ $h'$ $h$ $h'$ and around the pawl-pulleys, substantially as described.

5. In a velocipede, the operating-treadle G, having rearwardly-extending side pieces $g$, between which is pivoted a pedal G', a lug $g'$, pivoted to the end of the outer side piece $g$, and a similar longer lug $g^2$, pivoted to the outer side piece near its center, substantially as set forth.

6. In a velocipede, the combination, with the driving-wheel having each end of its hub provided with a ratchet-wheel, of pulleys journaled at each end of the driving-wheel hub and provided with pawls to engage the ratchet-wheels, treadles pivoted in the machine-frame and provided with pivoted pedals and pivoted lugs, rear and central lugs $g'$ $g^2$, of different lengths, as shown, and a cable connecting the lugs of the treadles, said cable passing over suitable friction-pulleys and around the pawl-pulleys, substantially as described.

ANDREW W. SCHIEDING.

Witnesses:
F. J. WEBSTER,
GEO. C. SAUER.